United States Patent [19]

Grassl

[11] 4,035,194
[45] July 12, 1977

[54] PROCESS OF TREATING SOYBEANS TO PRODUCE SOYBEAN EXTRACT, SOYBEAN OIL, AND SOYBEAN MEAL THEREFROM

[76] Inventor: Hugo H. Grassl, 2154 Greystone, Hoffman Estates, Ill. 60172

[21] Appl. No.: 524,501

[22] Filed: Nov. 18, 1974

[51] Int. Cl.² ..................................... C08L 89/00
[52] U.S. Cl. .................. 106/154 R; 260/123.5; 260/412.2; 426/509; 426/634
[58] Field of Search .............. 106/154; 260/123.5, 260/412.2, 412.3, 412.4; 426/431, 509, 634, 507

[56] References Cited

U.S. PATENT DOCUMENTS

| | | | |
|---|---|---|---|
| 2,026,676 | 6/1936 | Gill | 426/431 |
| 2,135,591 | 11/1938 | Moulton | 426/634 |
| 2,260,254 | 10/1941 | Kruse | 426/509 |
| 2,615,905 | 10/1952 | Forstmann | 260/123.5 |
| 2,901,353 | 8/1959 | Tsurumiku | 426/431 |
| 3,583,872 | 6/1971 | Wilding | 260/123.5 |
| 3,809,771 | 5/1974 | Mustakas | 426/364 |
| 3,865,802 | 2/1975 | Mustakas | 260/123.5 |

*Primary Examiner*—Theodore Morris
*Attorney, Agent, or Firm*—Joseph P. Gastel

[57] ABSTRACT

A method of obtaining a plurality of products from soybeans comprising the steps of adding a quantity of water to soybeans in a predetermined ratio to provide a water-soybean mixture and soaking said soybeans for a predetermined period of time, cooking said mixture at a temperature of less than about 235° F. and at a pressure of between about 2 and 10 PSIG for a sufficiently long time to produce a water-soybean solution along with the soybeans, removing said water-soybean solution from the soybeans, adding additional water to said soybeans and again cooking said soybeans in said additional water under the same conditions noted above, removing the water-soybean solution from the soybeans, removing water from said water-soybean solution to produce a concentrated water-soybean solution, extracting oil from said soybeans, drying said soybeans after extracting oil therefrom and grinding said dried soybeans to provide protein meal. The concentrated water-soybean solution is used as an adhesive, in addition to its other uses.

42 Claims, No Drawings

PROCESS OF TREATING SOYBEANS TO PRODUCE SOYBEAN EXTRACT, SOYBEAN OIL, AND SOYBEAN MEAL THEREFROM

The present invention relates to an improved process or treating soybeans so as to produce a soybean extract in the nature of a water solution of soy protein, soybean oil, and soybean meal from the same batch of soybeans.

By way of background, soybeans have been known as a source of protein, oil, and meal for many years. However, it was only comparatively recently that soybeans have been used on a relatively large scale. In the past the various methods of extracting usable products such as protein, adhesive, oil and meal from soybeans has either been extremely expensive and complicated, or extremely wasteful. In this respect certain of the processes for obtaining a product were either relatively involved, or required the addition of various chemicals, or required relatively expensive equipment, or a combination of all of the foregoing. Certain of the processes of the prior art were comparatively wasteful in that they utilized the soybeans to obtain only a single product, such as oil, and the remainder of the soybeans had to be reconstituted or used to provide a product which was relatively insignificant. In addition, some prior soybean treating processes could not produce soybean products without the use of specific process steps to reduce the intensity of the raw flavor of the soybeans. Certain other prior art processes exposed the soybeans to excess heat and/or chemicals, which in turn adversely affected the solubility of the soybeans and impaired their functional properties, and required additional process steps to resolubilize the proteins.

It is accordingly one important object of the present invention to provide an improved process which can be utilized to obtain protein, oil and meal from the same starting quantity of soybeans. A related object of the present invention is to provide an extremely simple, inexpensive and commercially practical process of obtaining all of the foregoing products from soybeans.

Another important object of the present invention is to provide an improved process for producing food products from soybeans in such a manner as to obviate any objectionable or unacceptable flavor characteristic of the soybeans without the requirement for performing any procedures in addition to those used for extracting the products from the soybeans.

Still another object of the present invention is to provide an extremely simple and inexpensive process for obtaining a soybean extract which can be used as an adhesive.

Yet another object of the present invention is to directly produce a soybean adhesive from the soybeans as a water soluble product, thus eliminating additional chemical process steps required to resolubilize the insoluble proteins obtained by presently used processes.

A further object of the present invention is to provide an improved process for treating soybeans so as to obtain maximum utilization of the basic soybeans to obtain a large number of highly commercial products which have increased protein efficiency and improved functional properties without diminishing the solubility of the soy proteins. Other objects and attendant advantages of the present invention will readily be perceived hereafter.

One aspect of the present invention is directed to a method of obtaining an extract from soybeans comprising the steps of adding a quantity of water to soybeans, cooking the soybeans in said water at a temperature of below about 235° F. for a sufficiently long period of time and at a predetermined pressure so as to produce a water-soybean solution, and removing a portion of the water from the water-soybean solution to concentrate the water-soybean solution. In accordance with a further aspect of the present invention, the extracted soybeans are further treated, as by pressing, in order to extract the oil therefrom. In accordance with a still further aspect of the present invention, the soybeans are dried and ground, after oil extraction, in order to produce protein meal therefrom. The various aspects of the present invention will be more fully understood from a reading of the following portions of the specification.

The improved process of the present invention yields a plurality of products including soybean extract, soybean oil, and protein meal. The soybean extract can be used to produce an adhesive which is remoistenable (water soluble) and which is also useful for food additives, fermentation processes, and bacteria breeding. In addition, it also has utility for each and every use to which a soybean extract can be utilized. The present process is extremely advantageous in that the soybeans are processed in such a manner that all of the resulting products are edible, and have increased protein efficiency with improved functional properties because the amino acids are not denatured by excess heat or the chemicals used in conventional processes. Thus, the process of the present invention has the advantage of being a pure food-grade process which is acceptable in accordance with the requirements of various governmental regulatory agencies.

In order to obtain the various products from soybeans, a plurality of relatively simple and inexpensive steps are followed. First of all, the soybeans are washed in potable water so as to remove all foreign material, such as dirt and the debris remaining after harvesting. Thereafter, the beans are soaked in potable water for a period of between eight and sixteen hours and more preferably for a period between ten and fourteen hours. The water to bean ratio is preferably 2:1 but may be as high as 3:1 or as low as 1.75:1. The purpose of soaking the beans is to raise the moisture content of the soybeans and to open the protective hull. It also serves as a step to rupture the cellular structure of the soybeans for ready extraction of protein and oil. If the water-bean ratio is relatively high, then the process would be more uneconomical in further steps wherein the soybean extract has to be concentrated because more water would have to be removed. On the other hand, if the water-bean ratio, which is initially used, is relatively low, then the degree of mixing between the water and the beans for optimum extraction is not realized. Furthermore, it is desired that there be more than a minimum amount of water with the beans during the heating step which follows so that the protein and carbohydrate structure of the beans is not deleteriously affected and the proteins remain soluble.

After the beans have soaked in accordance with the foregoing teaching, the beans are cooked in the water in which they were soaked in a pressure cooker at a pressure of between about 2 and 10 pounds per square inch gauge (PSIG) and more preferably at a pressure of between about 4 and 6 PSIG. The time of cooking at five PSIG would be for a period of about 1 hour, but can be for as little as ½ hour or as much as 1½ hours.

The lower the pressure, the lower will be the corresponding cooking temperature. The pressure is critical insofar as it affects the temperature. In this respect, it is desirable to maintain the resulting cooking temperature below about 235° F. because above this temperature the carbohydrates in the beans will decompose and the proteins will become insoluble.

The reason the beans are cooked under pressure is to reduce the treatment time during the cooking step and to control temperature. It will be appreciated that the beans can be cooked at atmospheric pressure if desired. However, under such conditions, the maximum cooking temperature will be approximately 212° F., which will necessitate a longer cooking time and therefore be wasteful of the heating energy which is utilized. In addition, it has been found that the resulting product is not as good in its resulting composition as the product which is obtained from cooking under pressure because the pressure accelerates the extraction of protein before deterioration of the protein structure. In this respect the elevated pressure and temperature provides a rupturing of the cells to produce a yield of 7-8% protein in the resulting liquor, whereas boiling at atmospheric pressure yields only about 1-3% protein in the liquor.

After the required period of cooking of the soybeans, the liquor or water-soybean solution is drawn off and placed in a suitable container. Thereafter potable water in an amount of between 65-100% by weight of the total weight of the original soybeans and more preferably between 65 and 70% of the weight of the original soybeans is added to the beans and the cooking procedure is repeated as described above. The amount of water which is added may be anywhere between about 40 to 300% of the original weight of the soybeans. Thereafter, on completion of the second cooking, the liquor or water-soybean solution is drawn off from the soybeans and placed in a storage receptacle. The foregoing step of adding water to the soybeans is repeated preferably for a total of six times, as it has been found that the maximum extraction of product from the soybeans occurs in six or more cycles. If desired, a continuous adding and removing of the soybean extract can be effected. However, it will be appreciated that under certain circumstances the number of cycles can be increased to sixteen or decreased to four, depending on the economics involved and depending on the basic characteristics of the beans being utilized and depending also on the desired composition of the resulting soybean liquor and the desired protein content of the resulting meal. In this respect if it is desired to obtain a large amount of concentrated liquor and relatively low protein meal, a large number of draws will be effected. On the other hand, if high protein content meal is desired, a lesser number of draws will be effected so that more protein is obtained in the meal.

Preferably the liquor which is drawn off from all of the cookings is placed in the same receptacle and is thereafter concentrated by evaporation. It will be appreciated however that, if desired, the concentration may be effected after each time that the liquor is drawn off, depending on whether it is more expedient to do so than to collect it. Preferably the evaporation is achieved by heating the liquor or water-soybean solution to a temperature of about 190° F. until the desired concentration is achieved. Alternatively, the liquor may be placed in pans and evaporated by exposure to moving currents of heated air without the addition of artificial heat.

The liquor or water-soybean solution which is drawn off from the step of cooking preferably contains about 6-7% of solids by weight. However, it will be appreciated that by varying the process in the manner discussed above, it can contain up to 8-9% of solids by weight or as low as 3-3.5% solids by weight. However, regardless of the initial concentration, the step of evaporation is for the purpose of producing a concentrated liquor or water-soybean solution which contains approximately 10-50% solids by weight. The concentrated liquor containing 10-50% solids by weight is extremely useful as an adhesive because after it is applied to a substrate and dried it is remoistenable solely by the application of water to function as an adhesive, which is an edible product and therefore can be used in food applications where the adhesive is in contact with edible products.

After the completion of the required number of cooking cycles with the beans, they are removed from the cooking apparatus and are ground up with a conventional grinder, such as a meat type of grinder manufactured by the Hobart or Rietz companies to a consistency which is suitable for oil extraction. Thereafter, the ground beans are pressed in a hydraulic type of press under a pressure from 500 to 10,000 pounds per square inch to extract the oil therefrom. An amount of between about 0.08 to 0.15 pounds of oil is obtained for each original pound of dry weight of beans which were supplied originally, depending on various factors. The method of processing the soybeans to obtain the oil is a method which is conventionally used with other types of products for oil extracting, except that the other products, such as soybeans, have not been treated to extract the protein prior to oil extraction, as in the present process. After the oil has been extracted as a result of the grinding and pressing steps, the extracted oil is centrifuged in a solid bowl type of centifuged or any other conventional kind to clarify the oil by removing the contaminants. The oil which has been obtained is of crude grade.

In accordance with a still further step of the present invention, the soybeans from which oil has been extracted in the preceding step are dried and ground or milled to provide protein meal which is useful as a food supplement for food additives or can be used as animal feed or for bacteria breeding. Preferably the soybeans which have been pressed are dried at a temperature of between 130° and 200° F. and more preferably between 160° and 180° F. During the drying it is the intention to remove the excess residual liquid without burning of the product or otherwise heating deleteriously so as to destroy its texture or taste. After the product has been properly dried, it is subjected to grinding in a hammer or roller type mill so as to provide a size which is commercially acceptable or comply with market demand. Alternatively, it can be ground to any size which may be desirable, depending on the end product to which it is to be used. In this respect, if it is to be used as feed supplement, it can be as large as 40 mesh, and if it is to be used for food additives, it can be as small as 100 mesh.

EXAMPLE I 3,000 Grams of commercial dry soybeans having about 8% moisture content were washed in potable water to remove all foreign matter, such as dirt, soil, loose hulls, debris, etc., and the beans were drained. Thereafter, 5,000 grams of potable water were added, and the beans were soaked for 16 hours. The water soybean mixture was placed in a pressure cooker and the internal pressure was brought up to 6 psi gauge and this pressure was maintained for one hour by adjusting the heat source and exhausting the pressure vessel to maintain the pressure substantially constant at 6 psi. Upon the completion of one hour of cooking, the pressure cooker pressure was relieved and the liquor was drawn off, through a 100 mesh screen, to remove the solids present in the liquor. Thereafter, 2,000 grams of potable water was added to the soybeans and they were again cooked at 6 psi gauge pressure for 45 minutes. The liquor was drawn off, as described above, and the foregoing cycle was repeated for a total of six times.

After the completion of the sixth cooking cycle and after the liquor was drawn off, the cooked soybeans were ground in a conventional meat-type grinder. The ground soybeans were then pressed in a hydraulic press having a commercially available special type of die providing for oil and moisture drainage. The pressing was effected at a gauge pressure of up to 10,000 PSIG. The resulting liquid, which is a mixture of soybean liquor and oil, was centrifuged in a decanter type centrifuge (liquor-liquor). The separated soybean liquor was saved and this could be added to the liquor from the various draws.

The drawn off liquor, which contains 6 to 8% solids, was evaporated to a concentration of 30–40% solids. The evaporation procedure was effected in a "pan in the pan type of set-up." More specifically, a pan containing the liquor was exposed to steam generated by hot water where the liquor temperature did not exceed 190° F. An auxiliary blower was provided to remove the generated moisture and keep the liquor in a slow agitated condition. In other tests the evaporation was effected in a two-stage vacuum-type conventional evaporator, which is more suitable for mass production.

The oil which was obtained from the centrifuging action is a crude oil and requires further refining if it is to be used in shortenings, margarines or in the cosmetic fields. However, such refining procedures are well known in the art.

The soybean pulp from which the oil was pressed was put through a rough grinder to create or form noodle-like members or ribbons and these soybean noodles were then dried in a forced-air belt dryer at a temperature of between about 170°–180° F. The dried soybean noodles were thereafter milled to about 80–100 mesh to obtain a soybean meal.

The foregoing procedure was performed under sanitary conditions so that the meal could be used as edible material in the processing of bakery products, meat additives, multi-purpose foods, bacteria breeding base, and the like.

A material balance which was obtained in the foregoing procedure is set forth in the following table:

MATERIAL BALANCE

|  |  | LIQUOR | | | | | | Analysis of Beans after 6th draw |
|---|---|---|---|---|---|---|---|---|
|  |  | No. 1 draw | No. 2 draw | No. 3 draw | No. 4 draw | No. 5 draw | No. 6 draw |  |
| Protein | % | 2.81 | 3.81 | 3.92 | 3.18 | 2.74 | 2.46 | 18.82 |
|  | wt.gm. | 52.603 | 66.294 | 71.736 | 57.717 | 50.470 | 45.952 | 924.062 |
| Oil | % | 0.031 | 0.029 | 0.028 | 0.028 | 0.029 | 0.026 | 16.62 |
|  | wt.gm. | 0.580 | 0.504 | 0.512 | 0.508 | 0.534 | 0.485 | 816.042 |
| Fiber/Cellulose | % | 0.07 | 0.10 | 0.092 | 0.081 | 0.074 | 0.073 | 2.68 |
|  | wt.gm. | 1.497 | 1.790 | 1.683 | 1.470 | 1.363 | 1.364 | 131.588 |
| Carbo/hydrate | % | 3.34 | 2.98 | 3.02 | 2.98 | 2.42 | 2.14 | 5.11 |
|  | wt.gm. | 62.524 | 51.852 | 55.266 | 54.087 | 44.576 | 39.975 | 250.901 |
| Lecithin | % | 0.022 | 0.026 | 0.031 | 0.024 | 0.026 | 0.023 | 0.68 |
|  | wt.gm. | 0.411 | 0.452 | 0.567 | 0.435 | 0.478 | 0.429 | 33.388 |
| Ash | % | 0.932 | 0.890 | 0.766 | 0.628 | 0.512 | 0.478 | 1.54 |
|  | wt.gm. | 17.447 | 15.486 | 14.017 | 11.398 | 9.431 | 8.929 | 75.614 |
| Total solids | % | 7.205 | 7.835 | 7.857 | 6.921 | 5.801 | 5.200 | 45.45 |
|  | wt.gm. | 134.876 | 136.329 | 143.783 | 125.616 | 106.854 | 97.136 | 2231.59 |
| Moisture | % | 92.795 | 92.165 | 92.143 | 93.079 | 94.199 | 94.800 | 54.55 |
|  | wt.gm. | 1737.124 | 1603.671 | 1686.217 | 1689.384 | 1735.146 | 1770.864 | 2678.40 |
| Liquor drawn, grams |  | 1872 | 1740 | 1830 | 1815 | 1842 | 1868 |  |
| Weight of cooked beans, grams |  |  |  |  |  |  |  | 4910 |

EXAMPLE II

In order to test the adhesive qualities of concentrated soy liquor, 60 lb. Golden Brown Gumming paper was coated with soy liquor prepared in the above described manner in which the concentration was 13% solids. The coating was effected by the use of a No. 14 Meyer rod in accordance with standard procedure. The paper was coated with an equivalent amount of 6 lb. of soy protein per ream of 500 sheets of standard paper, each sheet being 24 inches long times 36 inches wide. Thereafter, the sheets are dried at a 110° C. ambient temperature for 4 minutes and the moisture content of the sheets at that point was 6–8%. After the drying was completed, the sheets were tested by the Werle tack test. In this test an equivalent of 11 lb. of water per ream of 500 sheets was applied to the coated surface of the dried sheets with a No. 14 Meyer rod with 1 second open time (the time of application) and 0.7 seconds closed time (the time when a dry tape with no adhesive thereon was rolled over the wet-glue tape). A T.A.P.-P.I. tack test method (peel off process) indicated that for 100 grams peel resistance, a 12 second dwell time was required, that is, the sheet needed 12 seconds to develop a 100 gram peel strength.

By comparison, animal glue in a 50% concentration must be applied to an amount of 18 pounds of glue per ream of 500 sheets and a 100 grams peel resistance time is between 4–5 seconds. In addition, with the 13% concentration of liquor, tack and bond strength were obtained, which is unique and cannot be achieved with a 13% animal glue concentration. The sheets, after six months of storage, did not show any loss of tack, discoloration, or degradation of the surface. In addition, the liquor can be held at ambient temperature for 48 hours and at 160° to 180° F. for weeks without any changes in the characteristics.

The bond test indicated by examination a fiber tear v/s separation at the bond of 80%, which is equivalent to that obtained with a 50% animal glue solution.

EXAMPLE III

The tests described above in Example II was repeated, except that a 29% solution of soybean liquor was used on the paper so that there was an equivalent of 9 pounds of soy protein per ream of 500 sheets. The coated paper was tested by the same procedure described above in Example II. However, the dwell time became 9 seconds for 100 grams of peel resistance.

In the entire specification all percentages are by weight, unless otherwise specified.

It can thus be seen that the present invention is manifestly capable of achieving the above-enumerated objects, and while preferred embodiments have been disclosed, it will be appreciated that the present invention is not limited thereto but may be otherwise embodied within the scope of the following claims.

What is claimed is:

1. A method of obtaining a plurality of products from soybeans comprising the steps of adding a quantity of water to soybeans in a predetermined ratio to provide a water-soybean mixture, cooking said mixture at a temperature of about 212° to less than about 235° F. for a sufficiently long time to produce a water-soybean solution along with remaining soybeans, removing said water-soybean solution from the remaining soybeans, removing water from said water-soybean solution to produce a concentrated water-soybean solution, and extracting oil from said remaining soybeans.

2. A method as set forth in claim 1 including the step of soaking said soybeans for a predetermined period of time before said cooking step.

3. A method as set forth in claim 1 wherein said steps of adding said water and cooking said water-soybean mixture are repeated with the same soybeans for a number of times.

4. A method as set forth of claim 3 including the additional step of drying said remaining soybeans after extracting said oil therefrom and grinding said dried soybeans to provide protein-meal.

5. A method of obtaining an extract from soybeans comprising the steps of adding an initial quantity of water to soybeans, cooking the soybeans in said water at a temperature of about 212° to below about 235° F. for a sufficiently long period of time so as to produce a water-soybean solution in combination with the soybeans and removing a portion of the water from the water-soybean solution to concentrate the water-soybean solution.

6. A method as set forth in claim 5 including the step of soaking said soybeans of said initial quantity of water for a period of time prior to said cooking step.

7. The method of claim 6 wherein said soaking is for a period of between 8 and 16 hours.

8. The method of claim 6 wherein said soaking is for a period of between 10 and 14 hours.

9. A method as set forth in claim 5 including the step of removing the water-soybean solution from the soybeans prior to the step of removing said portion of the water from the water-soybean solution.

10. A method as set forth in claim 9 including the additional step of adding a second quantity of water to the soybeans remaining after the removal of the water-soybean solution, cooking said remaining soybeans in said second quantity of water for a sufficiently long time at a temperature of about 212° to below about 235° F. so as to produce a second water-soybean solution, removing said second water-soybean solution from said remaining soybeans, and removing a portion of said second quantity of water from said second water-soybean solution to concentrate said second water-soybean solution.

11. A method as set forth in claim 10 including the steps of adding said water-soybean solution and second water-soybean solution to each other prior to removing said water therefrom.

12. A method as set forth in claim 10 wherein the step of adding the water, cooking and removing water-soybean solution is repeated for a total of six times.

13. The method of claim 10 wherein the step of adding the water, cooking and removing water-soybean solution is repeated for a total of 4 to 16 times.

14. A method as set forth in claim 9 wherein said soybeans are cooked at a pressure of between about 2 and 10 psig.

15. A method as set forth in claim 14 including the steps of adding water to the remaining soybeans, cooking the soybeans at a pressure of between about 2 and 10 psig and at a temperature of 212° to below about 235° F. for a predetermined period of time and removing the water-soybean solution are repeated for a number of times.

16. A method as set forth in claim 15 wherein the step of adding the water, cooking and removing water-soybean solution is repeated for a total of 4 to 16 times.

17. A method as set forth in claim 15 wherein the cooking is effected at a pressure of between about 4 and 6 psig.

18. A method as set forth of claim 15 wherein each cooking cycle is effected at about 5 psig for a period of between ½ and 1½ hours.

19. A method as set forth in claim 15 wherein the water-soybean solution which is removed contains between about 3 and 9% solids by weight and wherein the portion of water which is removed causes the concentrated water-soybean solution to have between about 10 and 50% of solids by weight.

20. The method of claim 15 wherein the steps of adding water to the remaining soybeans, cooking the soybeans at a pressure of between about 2 and 10 psig and removing the water-soybean solution are repeated for a total of 4 to 16 times, and the amount of water added is between 65 and 300% of the original weight of the soybeans; wherein the initial quantity of water added to soybeans is in a weight ratio of water to soybeans of 1.75:1 to 3:1, wherein said soybeans are soaked in said initial quantity of water for a period of between 8 and 16 hours prior to cooking at a pressure of between about 2 and 10 psig for a period of between about ½ and 1½ hours, wherein the water-soybean solution which is removed contains between about 3% and 9% solids by weight and wherein the portion of water which is removed causes the concentrated water-soybean solution to have between about 10% and 50% of solids by weight.

21. The method of claim 1 wherein said oil is extracted by pressing at 500 to 10,000 psi and wherein 0.08 to 0.5 pounds of oil per pound of dry weight of soybeans are obtained.

22. The method of claim 21 wherein said remaining soybeans are dried after extracting said oil at a temperature of between 130° and 200° F.

23. The method of claim 22 wherein said remaining soybeans are dried after extracting said oil at a temperature of between 160° and 180° F. and are ground to a size between 40 and 100 mesh.

24. The method of claim 21 wherein said soybeans are cooked at a pressure of between about 2 and 10 psig, and wherein the initial quantity of water added to soybeans is in a weight ratio of water to soybeans of 1.75:1 to 3:1, and wherein said soybeans are soaked to said initial quantity of water for a period between 8 and 16 hours prior to cooking.

25. A method of obtaining an extract from soybeans comprising the steps of adding an initial quantity of water to soybeans, cooking the soybeans in said water at a temperature of below about 235° F. and at a pressure of between about 2 and 10 psig for a sufficiently long period of time so as to produce a water-soybean solution in combination with the soybeans and removing a portion of the water from the water-soybean solution to concentrate the water-soybean solution.

26. A method as set forth in claim 25 including the step of soaking said soybeans in said initial quantity of water for a period of time prior to said cooking step.

27. The method of claim 26 wherein said soaking is for a period of between 8 and 16 hours.

28. The method of claim 26 wherein said soaking is for a period of between 10 and 14 hours.

29. A method as set forth in claim 25 including the step of removing the water-soybean solution from the soybeans prior to the step of removing said portion of the water from the water-soybean solution.

30. A method as set forth in claim 29 including the additional step of adding a second quantity of water to the soybeans remaining after the removal of the water-soybean solution, cooking said remaining soybeans in said second quantity of water for a sufficiently long time so as to produce a second water-soybean solution, removing said second water-soybean solution from said remaining soybeans, and removing a portion of said second quantity of water from said second water-soybean solution to concentrate said second water-soybean solution.

31. A method as set forth in claim 30 wherein the step of adding the water, cooking the soybeans, and removing water-soybean solution is repeated for a total of six times.

32. The method of claim 30 wherein the step of adding the water, cooking the soybeans, and removing water-soybean solution is repeated for a total of 4 to 16 times.

33. A method as set forth in claim 29 wherein said soybeans are cooked for a period of between about ½ and 1½ hours.

34. A method as set forth in claim 33 wherein the steps of adding water to the remaining soybeans, cooking the soybeans at a pressure of between about 2 and 10 psig, and removing the water-soybean solution are repeated for a number of times.

35. A method as set forth in claim 34 wherein the cooking is effected at a pressure of between about 4 and 6 psig.

36. A method as set forth in claim 35 wherein the water-soybean solution which is removed contains between about 3 and 9% solids by weight and wherein the portion of water which is removed causes the concentrated water-soybean solution to have between about 10 and 50% of solids by weight.

37. A method as set forth in claim 26 wherein the initial quantity of water to soybeans has a weight ratio of between about 1.75:1 to 3:1.

38. A method as set forth in claim 37 including the step of soaking said soybeans in said initial quantity of water for a period of between 8 and 16 hours prior to said cooking step.

39. A method as set forth in claim 38 including the step of removing the water-soybean solution from the cooked soybeans, adding a second quantity of water to the soybeans remaining after the removal of the water-soybean solution, cooking said remaining soybeans in said second quantity of water for a sufficiently long time so as to produce a second water-soybean solution, removing said second water-soybean solution from said remaining soybeans, and removing a portion of said second quantity of water from said second water-soybean solution to concentrate said second water-soybean solution.

40. The method of claim 39 wherein the step of adding the water, cooking the soybeans and removing water-soybean solution is repeated for a total of 4 to 16 times.

41. The method of claim 39 wherein said second quantity of water is between 65 to 100% by weight of the total weight of the original soybeans.

42. The method of claim 39 wherein the cooking step is for between about 1 and 1½ hours.

* * * * *

UNITED STATES PATENT OFFICE
CERTIFICATE OF CORRECTION

PATENT NO. : 4,035,194
DATED : July 12, 1977
INVENTOR(S) : Hugo H. Grassl

It is certified that error appears in the above-identified patent and that said Letters Patent are hereby corrected as shown below:

```
Column 2, line 17, change "yeilds" to --yields--.
Column 4, lines 39-40, change "centifuged" to --centrifuge--.
Column 6, line 61, after "applied", change "to" to --in--.
Column 7, line 50, (claim 5), before "about" insert --between--;
          line 52-53, after "soybeans" insert --,--;
          line 54, change "concentrate the" to --obtain a
                   concentrated--.
Column 8, line 67, (claim 21), change "0.5" to --0.15--.
Column 9, line 12, (claim 24), after "soaked", change "to"
                   to --in--.
```

Signed and Sealed this

*Fifteenth* Day of *November 1977*

[SEAL]

Attest:

RUTH C. MASON
*Attesting Officer*

LUTRELLE F. PARKER
*Acting Commissioner of Patents and Trademarks*